(12) United States Patent
Chai et al.

(10) Patent No.: US 6,553,147 B2
(45) Date of Patent: *Apr. 22, 2003

(54) APPARATUS AND METHOD FOR DATA PARTITIONING TO IMPROVING ERROR RESILIENCE

(75) Inventors: Bing-Bing Chai, Plainsboro, NJ (US); Iraj Sodagar, North Brunswick, NJ (US)

(73) Assignees: Sarnoff Corporation, Princeton, NJ (US); Sharp Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/377,385

(22) Filed: Aug. 19, 1999

(65) Prior Publication Data

US 2003/0016876 A1 Jan. 23, 2003

Related U.S. Application Data

(60) Provisional application No. 60/103,081, filed on Oct. 5, 1998, and provisional application No. 60/106,297, filed on Oct. 30, 1998.

(51) Int. Cl.⁷ ............................. G06K 9/46; H04N 7/12
(52) U.S. Cl. ..................................... 382/240; 348/398.1
(58) Field of Search ............................ 382/239, 232, 382/233, 234, 235, 240, 251; 370/389, 543; 348/426, 409, 384, 398, 845, 705, 398.1; 375/240.15, 240.28

(56) References Cited

U.S. PATENT DOCUMENTS

5,168,356 A * 12/1992 Acampora et al. ...... 375/240.15
5,856,973 A * 1/1999 Thompson .................. 370/389

FOREIGN PATENT DOCUMENTS

| EP | 0 522 219 A1 | 1/1993 | ............ H04N/7/13 |
| EP | 0 797 358 A2 | 9/1997 | |
| EP | 0 860 999 A1 | 8/1998 | |
| EP | 0 914 004 A1 | 5/1999 | ............ H04N/7/26 |
| EP | 0 944 263 A1 | 9/1999 | |
| GB | 2 281 465 A | 3/1995 | |
| GB | 2 295 936 | 6/1996 | |

OTHER PUBLICATIONS

Shapiro (Embedded Image Coding Using Zerotrees of Wakelet Coefficients, IEEE Transactions on Signal Processing, vol. 41, No. 12 pp. 2445–2462), Dec. 1993.*

(List continued on next page.)

*Primary Examiner*—Andrew W. Johns
*Assistant Examiner*—Duy M. Dang
(74) *Attorney, Agent, or Firm*—William J. Burke

(57) ABSTRACT

An apparatus and a method for partitioning data to improve error resilience. Specifically, one or more segment markers (symbols) are entropy encoded along with the bitstream (payload) into a packet.

19 Claims, 9 Drawing Sheets

OTHER PUBLICATIONS

Yoo et al. ("Adaptive Quantization of Image Subbands with Efficient Overhead Rate Selection", IEEE 1996, pp. 361–364).*

Daut et al. "Two–Dimensional Hybrid Image Coding and Transmission Over Noisy Channels" Electrical and Computer Engineering Department, Rutgers University, IEEE, pp. 580–584, 1989.

Chrysafis et al. "Efficient Context–Bases Entropy Coding for Lossy Wavelet Image Compression" Integrated Media Systems Center, University of Southern California, IEEE, pp. 241–250, 1997.

Simoncelli et al. "Embedded Wavelet Image Compression Based on a Joint Probability Model" , IEEE, pp. 640–643, 1997.

Rogers J K et al: "Robust wavelet zerotree image compression with fixed–length packetization" Data Compression Conference, US, IEEE Computer Society Press, Los Alamitos, CA, Mar. 30, 1998, pp. 418–427, XP002118374 the whole document.

Creusere C D: "A New Method of Robust Image Compression Based on the Embedded Zerotree Wavelet Algorithm" IEEE Transactions on Image Processing, US, IEEE Inc. New York, vol. 6, No. 10, Oct. 1, 1997, pp. 1436–1442, XP000702095 ISSN: 1057–7149 the whole document.

Communication Relating to the Results of the Partial International Search corresponding to PCT/US99/23254.

* cited by examiner

| | HEADER (RESYNCH) 310 | BITSTREAM (PAYLOAD) 320 ⎯ 330 ERROR | |

300
*FIG. 3*

| HEADER (RESYNCH) 410 | BITSTREAM (PAYLOAD) 420a ⎯ SEGMENT | SEGMENT MARKER ⎯ 425 | BITSTREAM (PAYLOAD) 420b ⎯ 430 ERROR ⎯ SEGMENT | SEGMENT MARKER ⎯ 425 | ⋯ |

400
*FIG. 4*

|   |   |   |   |
|---|---|---|---|
| O 940 | O 930 | X 910 |   |
|       | O 920 |       |   |
|       |       |       |   |

| | | LEVEL 0 | | LEVEL 1 | | | | LEVEL 2 | | | | | | | |
|---|---|---|---|---|---|---|---|---|---|---|---|---|---|---|---|
| 0 | 1 | 3 | 5 | 7 | 17 | 19 | 23 | | 67 | 69 | 71 | | | | |
| 2 | | | 4 | | 16 | 18 | 22 | | 66 | 68 | 70 | | | | |
| | | | 6 | 13 | 21 | | 27 | 65 | | 77 | 79 | | | | |
| 8 | 9 | | 12 | 15 | 20 | 26 | 31 | 64 | | 76 | 78 | | | | |
| 10 | 11 | | 14 | | 25 | 30 | | | 74 | | 87 | | | | |
| | | | | | 24 | 29 | | | | 84 | 86 | | | | |
| 32 | 33 | 35 | | | 28 | 49 | 51 | | 73 | 83 | 85 | | | | |
| 36 | 37 | 39 | | | 48 | 53 | 55 | | 75 | 82 | | | | | |
| 34 | | | | | 52 | 50 | | 72 | | 81 | | 89 | 91 | | 95 |
| 38 | | | | | | | | | 80 | | 88 | 90 | | 94 |
| 40 | 41 | 43 | | | 54 | 57 | 59 | | | | | 93 | | | |
| 44 | 45 | 47 | | | 56 | 58 | 63 | | | | 97 | 99 | 101 | 103 | |
| 42 | | | | | 60 | 61 | | | | | 96 | 98 | 100 | 102 | |
| 46 | | | | | 62 | | | | 105 | 107 | 109 | 111 | | | |
| 128 | 129 | 131 | 133 | 135 | 141 | 143 | | | 104 | 106 | 108 | 110 | | | |
| 130 | 137 | 139 | | | 142 | | | | 113 | 115 | 117 | 119 | | | |
| 136 | | | | | | | | | 112 | 114 | 116 | 118 | | | |
| 132 | | | | 147 | 149 | 151 | | | 121 | 123 | 125 | 127 | | | |
| 138 | 145 | | | 146 | 150 | | | | 120 | 122 | 124 | 126 | | | |
| 134 | | | | 148 | 157 | 159 | 167 | 175 | 183 | 191 | 193 | 195 | 197 | 199 | |
| 140 | 153 | 155 | 163 | 165 | 173 | 181 | 189 | | 192 | 194 | 196 | 198 | | | |
| 144 | 154 | 162 | 170 | 178 | 187 | | | | 201 | 203 | 205 | 207 | | | |
| 152 | 161 | 169 | 177 | 185 | | | | | 200 | 202 | 204 | 206 | | | |
| 160 | | | | | | | | | 209 | 211 | 213 | 215 | | | |
| 168 | | | | | | | | | 208 | 210 | 212 | 214 | | | |
| 176 | | | | | | | | | 217 | 219 | 221 | 223 | | | |
| 184 | | | | | | | | | 216 | 218 | 220 | 222 | | | |

(Table reproduces the numeric cells from FIG. 8 with regions labeled LEVEL 0 (810), LEVEL 1 (820), and LEVEL 2 (830).)

APPARATUS AND METHOD FOR DATA PARTITIONING TO IMPROVING ERROR RESILIENCE

This application claims the benefit of U.S. Provisional Applications No. 60/103,081 filed on Oct. 5, 1998 and No. 60/106,297 filed on Oct. 30, 1998, which are herein incorporated by reference.

The invention relates to data partitioning in the field of digital multimedia communications. More particularly, the invention relates to a data partitioning method that improves error resilience, e.g., when applied to the entropy coding/decoding of hierarchical subband decomposed coefficients, e.g., wavelet transform coefficients.

BACKGROUND OF THE DISCLOSURE

In the field of digital multimedia communications, data streams carrying video, audio, timing and control data are packaged into various "packets". Generally, a packet is a group of binary digits that include data and control elements which are switched and transmitted as a composite whole. The data, control elements and other information are arranged in various specific formats.

Examples of such formats are disclosed in various international Standards. These standards include, but are not limited to, the Moving Picture Experts Group Standards (e.g., MPEG-1 (11172-*), MPEG-2 (13818-*) and MPEG-4 (14496-*)), H.261 and H.263. For example, MPEG defines a packet as consisting of a header followed by a number of contiguous bytes (payload) from an "elementary data stream". An elementary stream is simply a generic term for one of the coded video, coded audio or other coded bitstreams. More specifically, an MPEG-2 "transport stream" packet comprises a header, which may be four (4) or more bytes long with a payload having a maximum length of 184 bytes. Transport stream packets are part of one or more programs that are assembled into a transport stream. The transport stream is then transmitted over a channel with a particular transfer rate.

However, transmission of packets over a noisy communication channel, e.g., wireless communication, may cause corruption in the packets received by a receiver/decoder. Since some data streams or bitstreams carry compressed data that are correlated in a manner such that partial loss of a packet may cause the receiver/decoder to discard the entire packet. Namely, compression methods are useful for representing information as accurately as possible with a minimum number of bits and thus minimizing the amount of data that must be stored or transmitted.

For example, to further increase compression efficiency, some compression methods employ "significance-based" information, e.g., a significance map-value model, to indicate to a receiver/decoder the significance of the transmitted information or absence of transmitted information. The "significance-based" information is often previously defined, e.g., using symbols, such that the receiver/decoder is able to decipher additional information from the transmitted information. However, the loss of compressed data such as "significance-based"information often results in substantial errors when a receiver/decoder attempts to decompress or decode the corrupted data.

Second, another compression technique involves the use of entropy encoders, e.g., arithmetic and/or variable-length coder (VLC), that encodes a symbol in accordance with the symbol's probability density. Namely, the encoder will generally assign a shorter code word for a symbol that has a higher probability density, whereas a longer code word is assigned for a symbol that has a lower probability density, thereby reducing the total number of coding bits that are necessary to encode a data stream. Unfortunately, a corrupted packet that carries entropy encoded data may often go undetected until the entire packet is decoded. In fact, once the error is detected, the entire packet is often discarded, since one characteristics of an arithmetic encoder/decoding system is that every decoded symbol is treated as a valid symbol. Since errors are often detected from other symptoms, e.g., misalignment of the packets and so on, the decoder is often unable to distinguish where the error lies in the corrupted packet.

Additionally, another compression techniques involves the transformation of an input image into transform coefficients using hierarchical subband decomposition. For example, a useful compression technique appears in the Proceedings of the International Conference on Acoustics, Speech and Signal Processing, San Francisco, Calif. March 1992, volume IV, pages 657–660, where there is disclosed a signal compression system which applies a hierarchical subband decomposition, or wavelet transform, followed by the hierarchical successive approximation entropy-coded quantizer. A wavelet pyramid, also known as critically sampled quadrature-mirror filter (QMF) subband representation, is a specific type of multiresolution hierarchical subband representation of an image.

More specifically, in a hierarchical subband system, with the exception of the highest frequency subbands, every coefficient at a given scale can be related to a set of coefficients at the next finer scale of similar orientation according to a structure called a wavelet tree. The coefficients at the coarsest scale will be called the parent nodes, and all coefficients corresponding to the same spatial or temporal location at the next finer scale of similar orientation will be called child nodes.

A typical method of coding these transform coefficients is in "tree depth scan order as shown in FIG. 1, where an image is decomposed into three levels of resolution. Specifically, the wavelet coefficients are coded in tree blocks fashion, where each tree block is represented by three separate "texture units" shown with different shadings. Each texture unit is representative of a tree structure starting from the lowest or coarsest AC band to the highest or finest AC band coefficients.

In real life operation, one or more texture units may be corrupted or lost when transmitted over a noisy channel. The loss of these texture units or texture packets often results in noticeable errors in the decoded image.

Therefore, there is a need in the art for an apparatus and method for data partitioning that improves error resilience, e.g., when applied to the entropy coding/decoding of hierarchical subband decomposed coefficients, e.g., wavelet transform coefficients.

SUMMARY OF THE INVENTION

The present invention is an apparatus and a method for partitioning data to improve error resilience, e.g., in a coding/decoding system that employs entropy coding. Specifically, one or more segment markers (symbols) are entropy encoded along with the bitstream (payload) into a packet.

The placement of the segment marker into the packet is dependent upon whether the encoding of a number of "sub-units" have exceeded a "target segment length". Namely, a segment marker is encoded into the packet at an approximate interval that is defined to be greater than or equal to the target segment length.

Additionally, the placement of the segment marker into the packet is also limited to being located at a juncture between two encoded "sub-units". A sub-unit is defined as a logical coding sub-unit of a texture unit that is being encoded into the packet. Since texture units can be defined in a number of different manners, the present invention also presents a number of sub-units having different defined structures. One advantage in such limiting of the placement of a segment marker to be between sub-units is that it provides an easily identifiable point for the decoder to start searching for the segment marker.

Once the segment markers are encoded as described, the decoder can now readily determine if a current packet is corrupted. Namely, if the decoder is able to decode an uncorrupted segment marker as anticipated in the packet, then all the bits up to the point of the segment marker are considered also to be uncorrupted.

However, if the decoder is unable to decode a segment marker as anticipated in the packet, then all the bits from a prior decoded segment marker up to the point of the corrupted or missing segment marker must be corrupted to some extent. This set of identified bits in the packet are then discarded as corrupted bits, i.e., the bits starting from the last correctly decoded segment marker/packet header to the end of the packet are discarded. However, instead of discarding the entire packet as known in the prior art, only a portion of the packet is now discarded, thereby improving error resilience.

The present invention provides several advantages. First, the use of an encoded segment marker reduces the amount of overhead, i.e., shorter code word, when compared to other packet markers such as adding additional Resynch markers. Second, no extra information is needed in the packet header to communicate the existence of the segment marker. Third, reinitialization of the entropy encoder is not required.

BRIEF DESCRIPTION OF THE DRAWINGS

The teachings of the present invention can be readily understood by considering the following detailed description in conjunction with the accompanying drawings, in which:

FIG. 3 depicts a block diagram of a packet structure having an error;

FIG. 4 depicts a block diagram of a packet structure having an error that is disposed between segment markers of the present invention;

FIG. 6 is a schematic illustration of a sub-unit for a texture unit that is defined in accordance with a layer-by-layer scanning order;

FIG. 7 is a schematic illustration of a second embodiment of a sub-unit for a texture unit that is defined in accordance with a layer-by-layer scanning order;

FIG. 8 is a schematic illustration of a sub-unit for a texture unit that is defined in accordance with a band-by-band scanning order;

FIG. 9 is a schematic illustration of a context formation for an arithmetic encoder;

To facilitate understanding, identical reference numerals have been used, where possible, to designate identical elements that are common to the figures.

DETAILED DESCRIPTION

Figure 1:
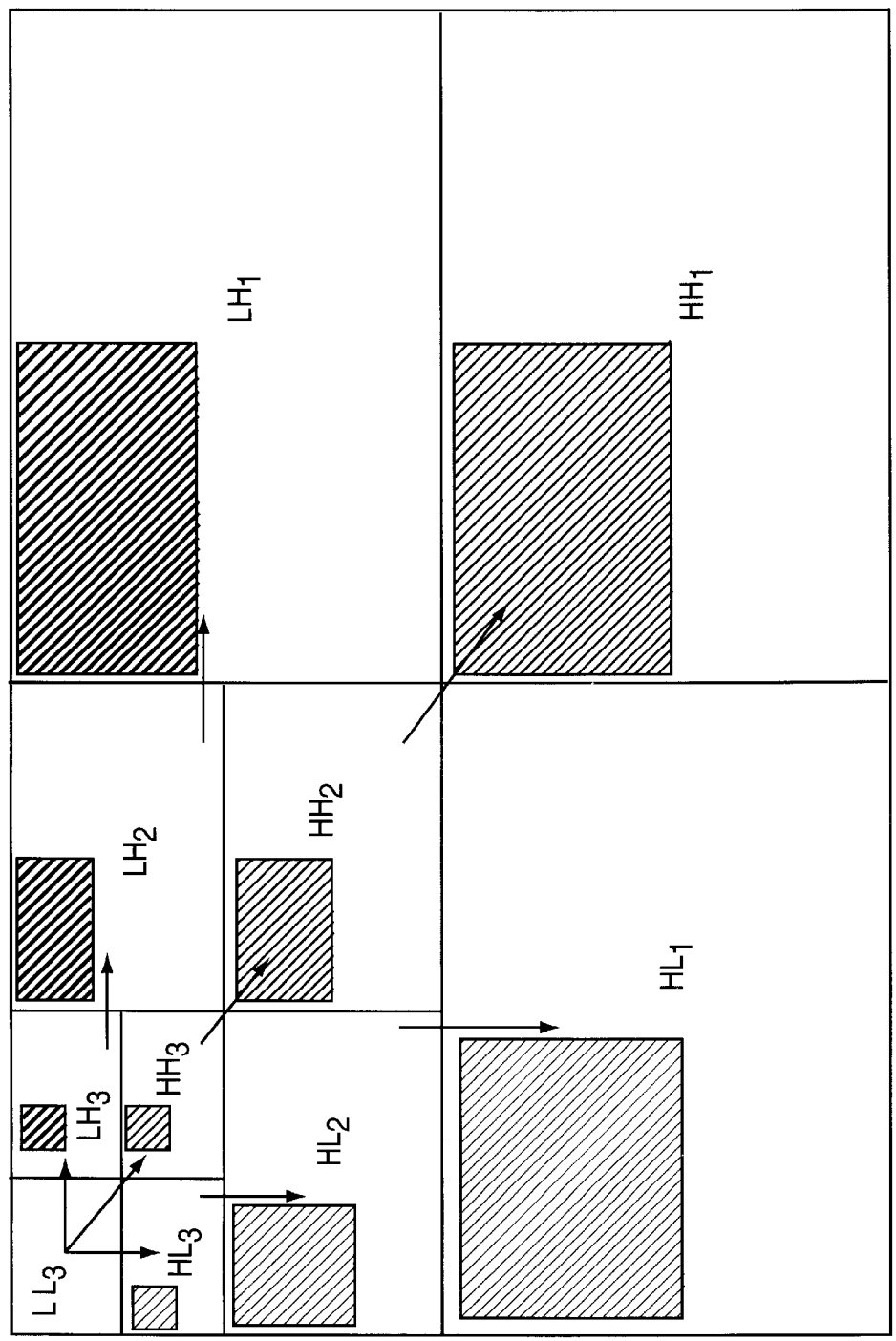
FIG. 1 is a schematic illustration of the parent-child dependencies of subbands in an image decomposed to three levels within a wavelet tree having a plurality of texture units as used in the prior art.
Figure 2:
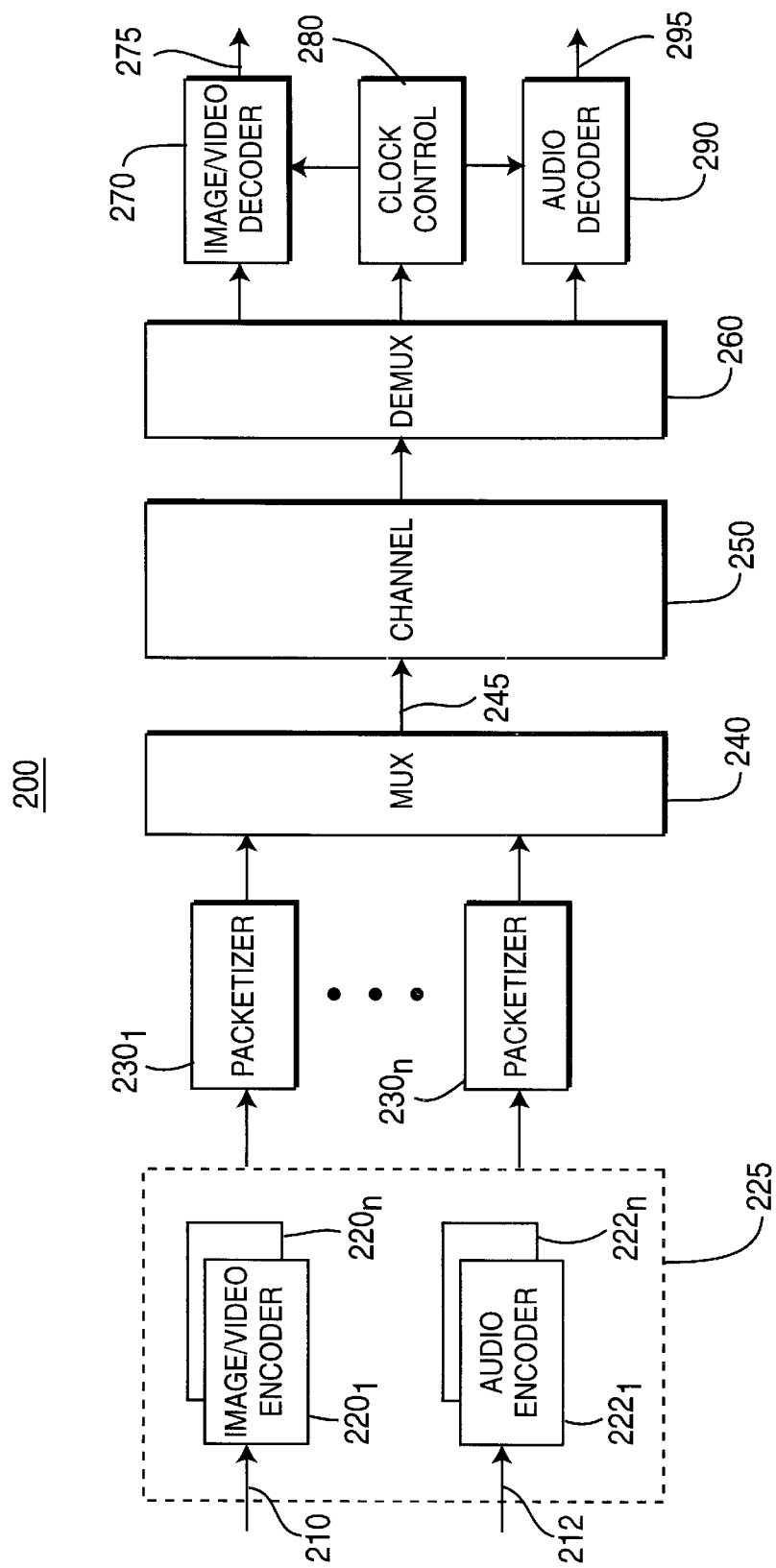
FIG. 2 depicts a block diagram of a simplified packet stream system of the present invention.

FIG. 2 depicts a block diagram of a simplified structure of a packet stream system 200 of the present invention. For illustration, a data stream such as a "transport stream" as defined in accordance with the MPEG standards is used in the packet stream system illustrated in FIG. 2. Although the present invention is described below using the transport stream as an example, those skilled in the art will realize that the present invention can be applied to any packet streams, e.g., an MPEG "program stream" or any other packet streams in accordance with other formats. Furthermore, although the present invention is described below using the term "stream", it should be understood that the various operations described below may be performed on the entire stream or portion thereof.

System 200 includes an image/video encoder 220 for receiving and encoding video data 210 into an elementary video bitstream. The video encoder 220 is an encoder capable of generating hierarchical subband decomposed coefficients, e.g., wavelet coefficients with or without significance-based information. The image/video encoder 220 may be a single image encoder, e.g., a Joint Photographic Experts Group (JPEG) encoder, GIF, PICT, and the like, or an encoder for an image sequence (video), e.g., a block-based or wavelet-based image encoder operating in accordance with an MPEG standard. Throughout this disclosure the terms image sequence, images, and video are used interchangeably. In its broadest sense, the invention operates in cooperation with any form of image or image sequence encoder that would benefit from the present packet structures to provide error resilience.

One example of such an encoder is the Sarnoff Very Low Bit Rate (VLBR) encoder, which is disclosed and claimed in U.S. Pat. No. 5,764,805 (issued on Jun. 9, 1998), and is herein incorporated by reference. Other examples of such encoders are disclosed in U.S. patent application entitled "Apparatus And Method For Encoding Zerotrees Generated By A Wavelet-Based Coding Technique" (filed on Oct. 24, 1996 with Ser. No. 08/736,114), which is herein incorporated by reference.

Similarly, the system may include an audio encoder 222 for receiving and encoding audio data 212 into an elementary audio bitstream. However, those skilled in the art will realize that a plurality of image/video encoders $220_n$ and audio encoders $222_n$ can be employed to produce a plurality of elementary bitstreams. In fact, the plurality of video and audio encoders can be collectively represented by a server 225, which may employ various encoders and/or may simply contain a plurality (or a library) of stored elementary streams in various storage media. Generally, the output of such server contains interleaved program streams.

In turn, these bitstreams are sent to packetizers 230 of the present invention, where the elementary bitstreams are converted into packets. Information for using the packets independently of the transport stream may be added when the packets are formed. Thus, non-audio/video data are allowed, but they are not shown in FIG. 2. It should be noted that although in a preferred embodiment, the present encoder and the packetizer are implemented in a single module, those skilled in the art will realize that the functions performed by the encoder and the packetizer can be jointly or separately implemented as required by a particular application.

The packets are received and multiplexed by the transport stream multiplexer 240 to produce a transport stream 245. Packets constructed from elementary streams that form a program (a group of "Packet Identifiers" (PIDs) with associated video and audio data) generally share a common time base. Thus, the transport stream may contain one or more programs with one or more independent time bases, where the time bases are used for synchronized presentation. The time bases of different programs within a transport stream may be different.

The transport stream 245 is transmitted over a transmission channel 250, which may further incorporate separate channel specific encoder and decoder (not shown). Next, the transport stream 245 is demultiplexed and decoded by a transport stream demultiplexor 260, where the elementary streams serve as inputs to video decoder 270 and audio decoder 290, whose outputs are decoded video signals 275 and audio signals 295, respectively.

Furthermore, timing information is also extracted by the transport stream demultiplexor 260 and delivered to clock control 280 for synchronizing the video and audio decoders with each other and with the channel. Synchronization of the decoders with the channel is accomplished through the use of the "Program Clock Reference" (PCR) in the transport stream. The PCR is a time stamp encoding the timing of the bitstream itself and is used to derive the decoder timing.

As discussed above, the packetizer 230 organizes the bitstream from the encoder into packets for transmission. If the transmission channel 250 is noisy, the transmitted packets can be corrupted or partially lost. Although the present invention describes a method below for manipulating a bitstream to form a particular packet structure within a packetizer 230, it should be understood that this operation can also be performed within the encoder 220 itself. As such, the implementation of the present invention is a matter of designer choice.

Error resilience is particularly important for packets carrying hierarchically decomposed information, i.e., hierarchical subband decomposed coefficients. Hierarchical subband decomposition provides a multi-resolution representation of an image. For example, the image is first decomposed into four subbands, LL, LH, HL, HH, each representing approximately a quarter of the entire frequency band. To obtain the next coarser scale image representation, the LL band is further divided into four subbands. The process can be repeated to form a hierarchical subband pyramid. It should be understood that hierarchical subband decomposition can apply any number of subband decompositions.

Hierarchical subband decomposed coefficients can be packetized into units called "texture packets" for error resilience. A texture packet consists of one or more coding units, named "texture units". Namely, if the texture unit is packetized into a single packet, then the packet is referred to as a texture packet. Examples of various texture unit structures are disclosed in U.S. patent application Ser. No. 09/377,383 entitled "Apparatus And Method For Forming A Coding Unit," which is herein incorporated by reference and is filed simultaneously herewith.

FIG. 3 depicts a block diagram of a packet structure 300 having a header 310 and a payload 320 carrying a bitstream that is representative of coded data, e.g., entropy coded hierarchical subband decomposed coefficients. The header carries a Resynch marker that allows a decoder to synchronize the decoding process with the incoming packets, e.g., the start of a new packet. Specifically, in noisy channels, the addition of resynchronization markers at the beginning of each sequence (in JPEG terminology) or packet allows the resynchronization of the decoding process at the next Resynch marker if an error is encountered.

FIG. 3 also illustrates an error 330 located somewhere within the payload of the packet that may have been caused by a noisy channel. As discussed above, the location and, at times, the existence of the error often goes undetected until the entire packet is decoded. Once the error is detected, the decoder is often unable to locate and correct the error due to the nature of entropy encoding and is forced to discard the entire payload 320 of the packet 300. For example, all the coefficient values are set to zero in the erroneous sequence or packet. The decoder must then rely on various error concealment methods to replace the missing data in the discarded payload. Examples of such error concealment methods are disclosed in U.S. patent application Ser. No. 09/377,384 entitled "Apparatus And Method For Error Concealment For Hierarchical Subband Coding And Decoding," which is herein incorporated by reference and is filed simultaneously herewith.

To aid in the understanding of the problem of having an undetected error in a packet carrying entropy coded information, an example of an efficient context-based entropy encoding method used in encoder 220 is illustrated in FIG. 9. Namely, context modeling is used to determine the probability model that is used to entropy code each coefficient. FIG. 9 illustrates a novel context model where a coefficient, shown as "x" 910 with coordinate (i,j) is entropy encoded as follows:

$$\text{Model\_no} = f(i-1, j-1) + f(i-1, j)*2 + f(i, j-1)*4 \quad (1)$$

where $$f(x, y) = \begin{cases} 1, \text{ if } \text{coeff}(x, y) \text{ is available and nonzero} \\ 0, \text{ else} \end{cases}$$

Namely, the new context model is premised on its three neighbors shown as "o", 920–940. It should be noted that a total of eight (8) context models can be formed based on the significance of these three neighbors in accordance with equation 1 and the order of the three neighbors in accordance to equation (1) can be interchanged as desired.

FIG. 9 illustrates one example of the correlation that is employed in an entropy coder. This complex correlation is the source of the present criticality where if a portion of a packet is corrupted, then the entire packet is often discarded since it is very difficult to ascertain the exact nature of the error and the location of the error in the packet.

In contrast, FIG. 4 now depicts a block diagram of a packet structure 400 having a header 410 and a plurality of payload segments 420a–420b (herein referred to as "segments") carrying a bitstream that is representative of coded data, e.g., entropy coded hierarchical subband decomposed coefficients. The payload segments 420a–420b are separated by segment markers 425 of the present invention. Thus, in this example, the error 430 is now disposed between two segment markers 425. However, it should be understood that the error may occur within a segment that is between a header and a segment marker or a segment marker and an end of packet marker or a header for the next packet (not shown).

In brief, the present invention codes an extra symbol (representative of the segment marker) whenever a segment of the bitstream in a packet exceeds a "predefined length" and is at a "distinguishable location" in the encoded image. An example of the predefined length is approximately 512 bits. It should be noted that this predefined length can be modified in accordance with a particular application or a particular packet format. Thus, an error 430 can be identified with respect to its location if an anticipated segment marker is not present at the "predefined length" and at a predetermined location within the encoded image. For example, if the error 430 is detected, then the decoder can then only discard the payload segment 420*b* up to the segment marker 425, thereby retaining payload segment 420*a*. This ability to retain even a small portion of the payload of a packet will greatly improve the error resilience of an encoding/decoding system.

The extra symbol can be a symbol that is different from any other possible symbols or it can be a symbol in an existing symbol set that is being used by the encoder that is generating the bitstream. For example, the segment marker can be selected as having a certain bit pattern, e.g., "0101". Nevertheless, the extra symbol is entropy encoded in the same manner as other symbols that are encoded to form the payload of the packet. Generally, if a symbol is chosen from an existing symbol set, it is preferable to select a rarely occurring symbol to represent the segment marker.

In one embodiment, if the "predefined length" is "N" bits, and the image is encoded in a raster scan order line by line, the bitstream length can be checked at the end of each line of the image. i.e., a "distinguishable location" in the encoded image. If at the end of the $i^{th}$ line, the bitstream length exceeds "N" bits, and the end of a texture unit has not been reached (i.e., not at the end of a packet), then a symbol representative of a segment marker is encoded into the bitstream. Normal coding resumes and the process is repeated throughout the coding process until the end of the packet is reached. The calculation of the bitstream length for each segment starts from a Resynch marker of a packet or after the encoding of the symbol representative of the segment marker.

The present invention provides several advantages. First, the use of an encoded segment marker reduces the amount of overhead, i.e., shorter code word, when compared to other packet markers such as adding additional Resynch markers. Second, no extra information is needed in the packet header to communicate the existence of the segment marker. Third, reinitialization of the entropy encoder is not required.

Figure 11:
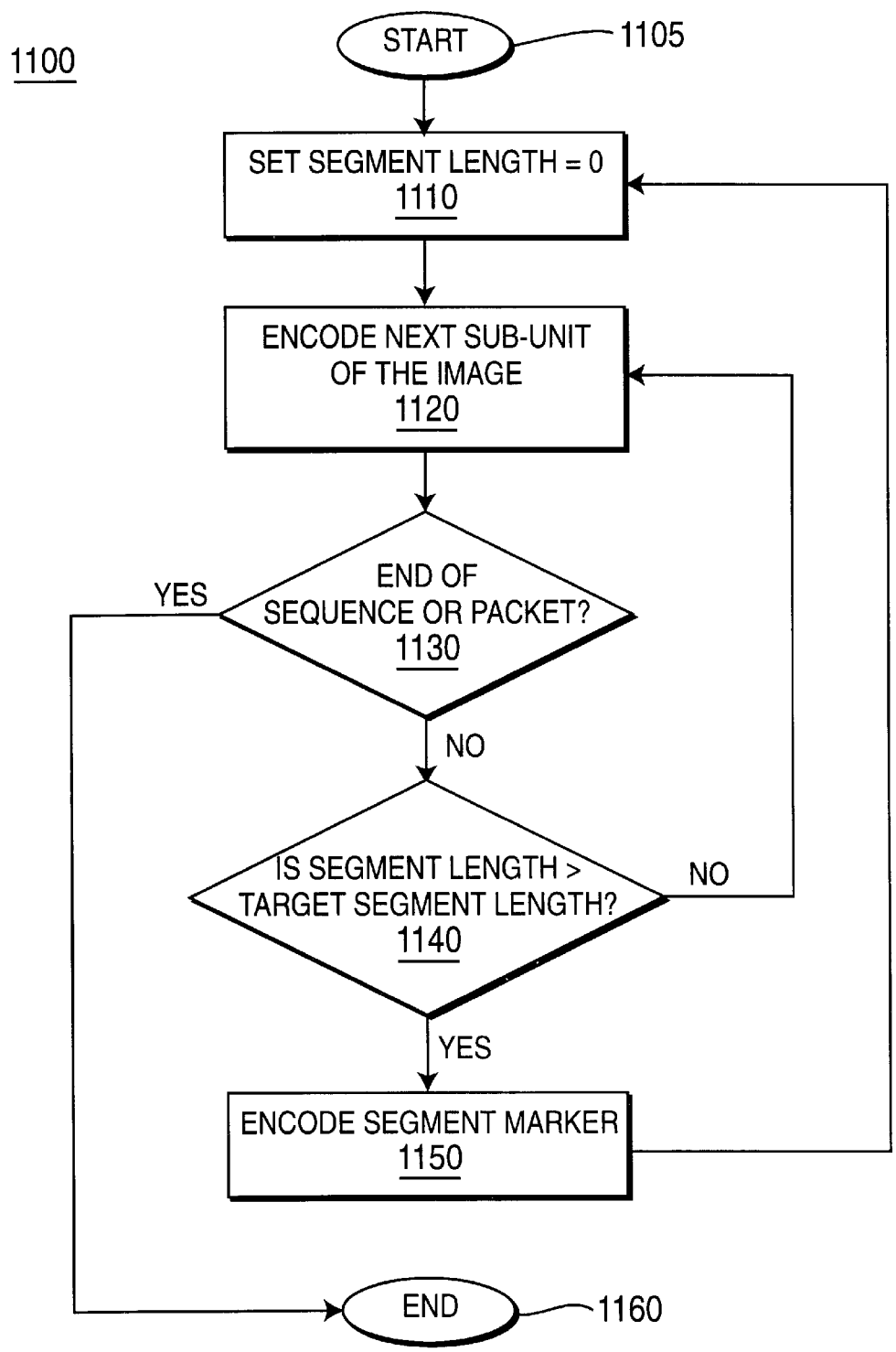
FIG. 11 illustrates a flowchart of the present data partitioning method.

FIG. 11 illustrates a flowchart that summarizes the present data partitioning method 1100 (for one packet) that can be executed in a general purpose computer as described below. Method 1100 starts in step 1105 and proceeds to step 1110 where a counter for counting the current segment length (i.e., the predefined length in the packet where a segment marker will be inserted) is set to zero.

In step 1120, a "sub-unit" of the image is encoded into the packet. In the above example, a sub-unit is defined to be a line of pixels of the image. A sub-unit is defined as a logical coding sub-unit of a texture unit that is being encoded into the packet and serves as a distinguishable location or distinctive point for the decoder to search for the segment marker. However, since texture units can be defined in a number of different manners, the present invention also presents below a number of sub-units having different defined structures.

In step 1130, method 1100 queries whether the end of a sequence or a packet has been reached. If the query is affirmatively answered, then method 1100 ends in step 1160. If the query is negatively answered, then method 1100 proceeds to step 1140.

In step 1140, method 1100 queries whether the segment length count is greater or equal to a threshold, target segment length. For example, the target segment length is set according to the bandwidth at which the current image is being coded. If the query is affirmatively answered, then method 1100 proceeds to step 1150 where a symbol representative of a segment marker is coded into the packet. After a segment marker is encoded in step 1150, method 1100 returns to step 1110 where the segment length counter is again reset to zero. If the query is negatively answered, then method 1100 returns to step 1120 and encodes a next sub-unit. The steps of FIG. 11 are repeated until the end of a sequence or packet is reached.

Pseudo codes for coding a sequence or packet of the present invention are now provided for both perspectives, encoder and decoder. It is suggested that the reader applies the flowchart of FIG. 11 to comprehend these pseudo codes.

Encoder:
```
Segment_length=0;
While (not end of sequence or packet){
    If (Segment_length<target_segment_length)
        Encode one sub-unit in the sequence;
    Else{
        Encode a segment_marker with entropy coding
        Segment_length=0;
    }
}
```
Decoder:
```
Segment_length=0;
While (not end of sequence or packet){
    If (Segment_length<target_segment_length)
        decode one sub-unit in the sequence;
    Else{
        Segment_length=0;
        If(decode a segment_marker correctly)
            Continue;
        Else{
            Zero out the coefficients after the last
            correctly decoded segment_marker;
            go to next packet;
        }
    }
}
```

Figure 5:
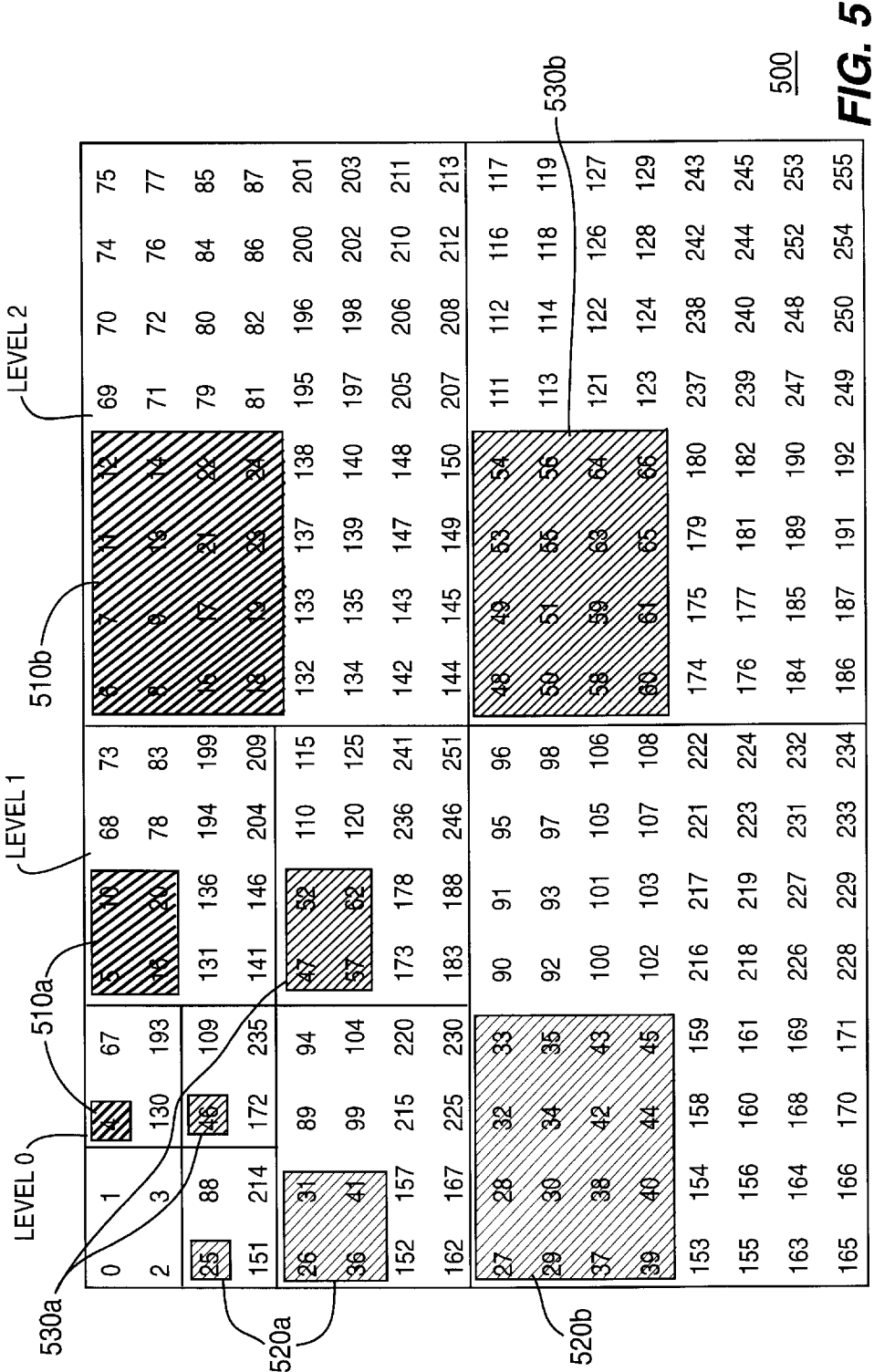
FIG. 5 is a schematic illustration of a sub-unit for a texture unit that is defined in accordance with a tree-depth scanning order.

FIG. 5 is a schematic illustration of the structure of a sub-unit for a texture unit that is defined in accordance with a tree-depth scanning order. In the tree-depth scanning mode, the texture unit consists of the bitstream generated when encoding one tree structure. Namely, since a sub-unit is defined as a part or portion of a texture unit, as the texture unit formation is altered, the structure of the sub-unit must also be redefined accordingly.

Referring to FIG. 5, assuming that there are N (N=3 for FIG. 5) wavelet decomposition levels, let the lowest frequency AC subbands (i.e., the smallest subbands) be level 0, and the highest frequency AC subbands (the largest subbands) be level N−1, the sub-unit is defined as follows for tree-depth scanning as shown in FIG. 5:

*a*) All pixels in levels 0 and 1 within a tree block;

*b*) The $2^l \times 2^l$ block within a tree block for levels $l=2, 3$;

*c*) The 16×16 block within a tree block for levels $l>3$;  (2)

where the shaded area is representative of one tree block. Namely, condition "a" of equation (2) for defining a sub-unit is illustrated by sub-units 510*a*, 520*a* and 530*a*. Condition "b" of equation (2) for defining a sub-unit is illustrated by sub-units 510*b*, 520*b* and 530*b*, where l is 2, i.e., a 4×4 block of coefficients constitutes a sub-unit. Condition "c" of equation (2) for defining a sub-unit is not illustrated, but sets each sub-unit to be no greater than a 16×16 block of coefficients for all decomposition level greater than three (3).

Figure 6:
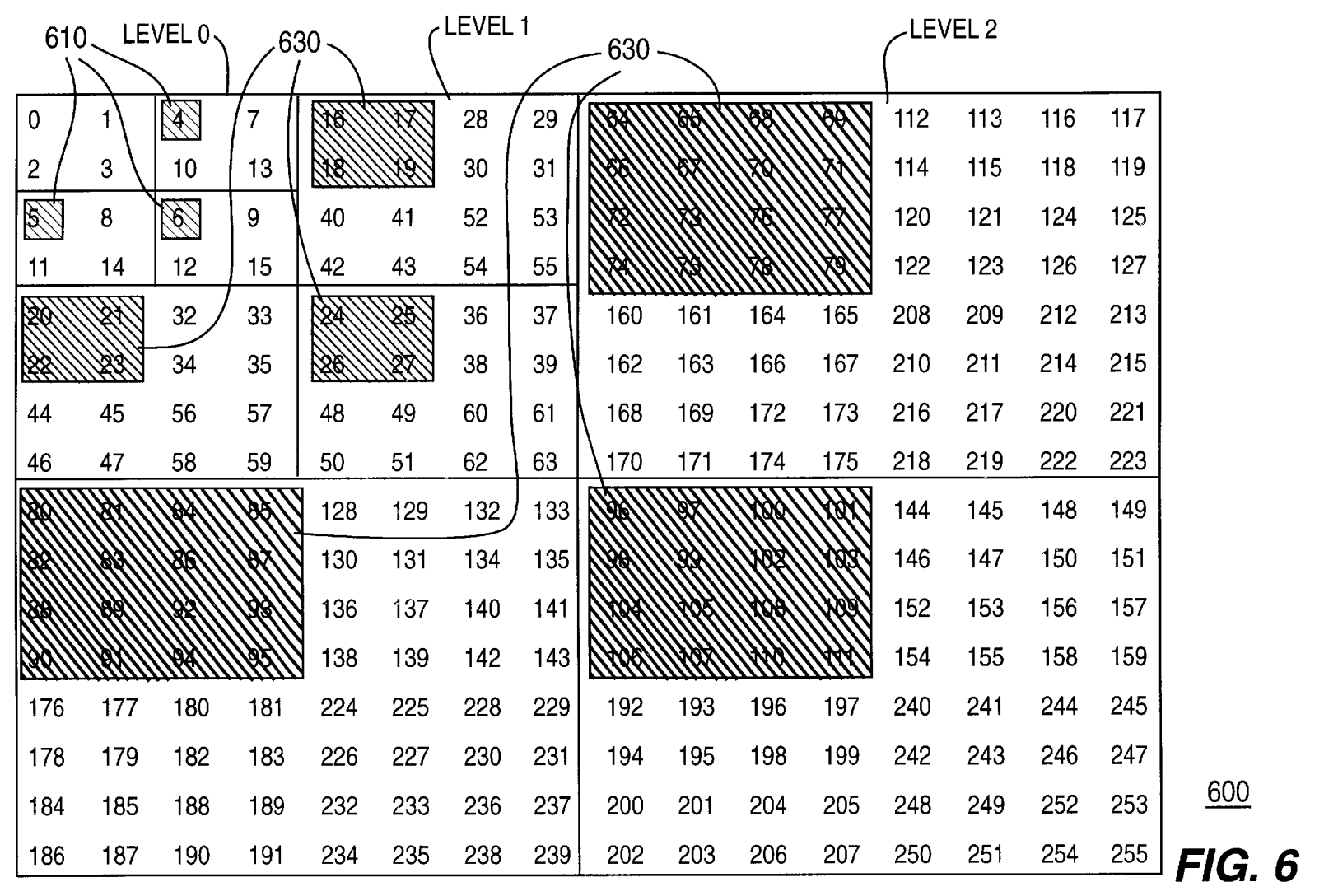
Figure 7:
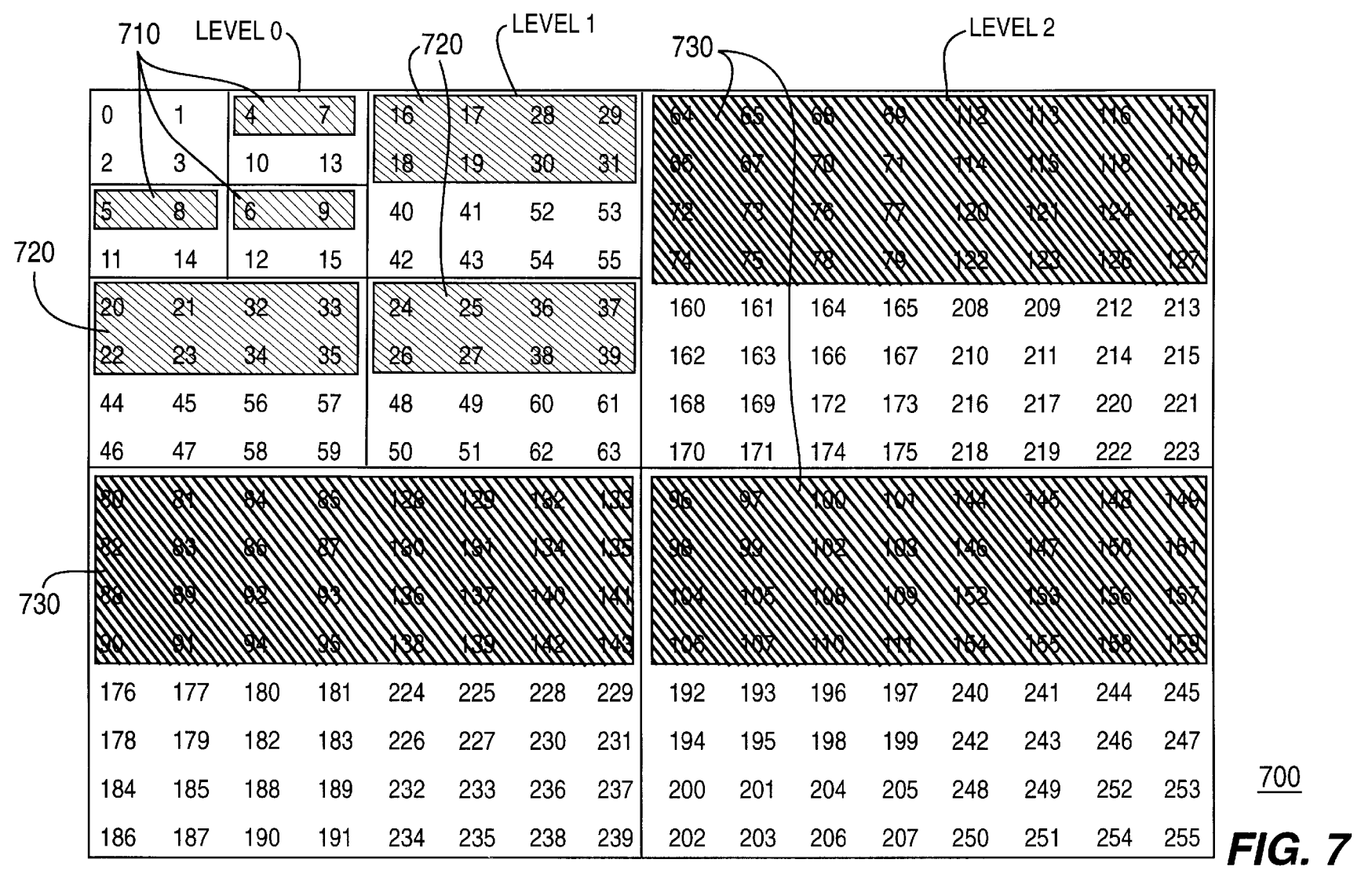

FIGS. 6 and 7 are schematic illustrations of the structure of a sub-unit for a texture unit that is defined in accordance with a layer-by-layer scanning order. In layer-by-layer scan, the pixels are coded by decomposition or wavelet levels, i.e., all coefficients for all subbands within a decomposition level are coded first prior to coding subbands of a next decomposition level. The sub-unit can be defined in two ways.

In FIG. 6, a sub-unit is defined as comprising a block of coefficients from each subband corresponding to the same decomposition level, as shown in three separate shade areas 610, 620, and 630. Each shade represents one sub-unit. In other words, at decomposition level $l$, a sub-unit is the union of three $2^l \times 2^l$ blocks from the three subbands representing the same spatial location. Alternatively, one can also treat the $2^l \times 2^l$ block from each of the subbands as a sub-unit. Namely, the sub-unit structure can be expressed as:

$a$) All pixels in levels 0 and 1 within a texture unit;

$b$) The $2^l \times 2^l$ block within a texture unit for levels i l=2, 3;

$c$) The 16×16 block within a texture unit for levels $l$>3; (3)

In FIG. 7, a sub-unit is defined as comprising a row of coefficients rom each subband corresponding to the same decomposition level, as shown in three separate shade areas 710, 720, and 730. Each shade represents one sub-unit. In other words, at decomposition level $l$, a sub-unit is the union of $l$ rows from each of the three subbands. It should be noted that the difference between the sub-unit structures of FIG. 6 and FIG. 7 is the different size of the blocks in each subband. For example, if the size of the "block" of FIG. 6 is made to be the size of a "row", then the sub-unit structures of FIG. 6 and FIG. 7 are equivalent.

In sum, in layer-by-layer scanning mode, the texture unit consists of the bitstream generated when encoding a slice or portion of a slice of subband coefficients from all three subbands in the same wavelet decomposition layer. It should be noted that a slice can correspond to one or more rows in a subband. The subbands are scanned using the same scanning order to encode the coefficients.

FIG. 8 is a schematic illustration of the structure of a sub-unit for a texture unit that is defined in accordance with a band-by-band scanning order. For band-by-band, the texture unit consists of the bitstream generated when encoding a slice of subband coefficients ($2^l$) from one subband. The sub-unit is one or more rows of coefficients in a subband. For example, a sub-unit can be defined as comprising a block of $2^l$ rows in a subband at $l$ th level, as shown in three separate shade areas 810, 820, and 830.

Figure 10:
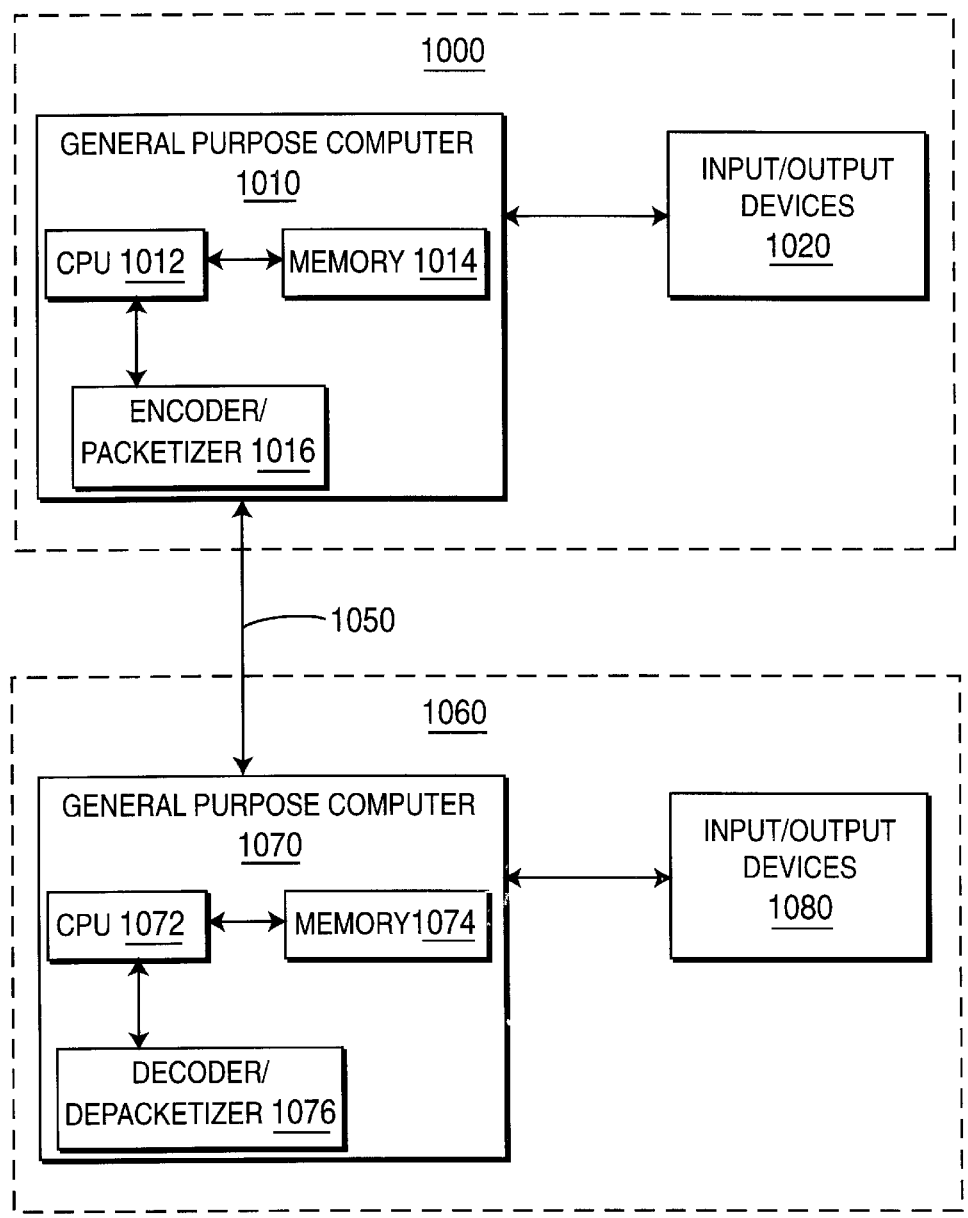
FIG. 10 illustrates a block diagram of an encoding system and a decoding system of the present invention.

FIG. 10 illustrates a block diagram of an encoding system 1000 and a decoding system 1060 of the present invention. The encoding system 1000 comprises a general purpose computer 1010 and various input/output devices 1020. The general purpose computer comprises a central processing unit (CPU) 1012, a memory 1014 and an encoder/packetizer 1016 for encoding and packetizing an image, video and/or audio signal.

In the preferred embodiment, the encoder/packetizer 1016 is simply the video encoder 220, the audio encoder 222 and/or the packetizer 230 as discussed above in FIG. 2. It should be understood that the encoders and the packetizer can be implemented jointly or separately. The encoder/packetizer 1016 can be physical devices, which are coupled to the CPU 1012 through a communication channel. Alternatively, the encoder/packetizer 1016 can be represented by a software application (or a combination of software and hardware, e.g., using application specific integrated circuits (ASIC)), where the software is loaded from a storage medium, (e.g., a magnetic or optical drive or diskette) and operated by the CPU in the memory 1014 of the computer. As such, the encoder/packetizer 1016 of the present invention can be stored on a computer readable medium.

The computer 1010 can be coupled to a plurality of input and output devices 1020, such as a keyboard, a mouse, an audio recorder, a camera, a camcorder, a video monitor, any number of imaging devices or storage devices, including but not limited to, a tape drive, a floppy drive, a hard disk drive or a compact disk drive.

The encoding system is coupled to the decoding system via a communication channel 1050. The present invention is not limited to any particular type of communication channel.

The decoding system 1060 comprises a general purpose computer 1070 and various input/output devices 1080. The general purpose computer comprises a central processing unit (CPU) 1072, a memory 1074 and an decoder/depacketizer 1076 for receiving and decoding a sequence of encoded images.

In the preferred embodiment, the decoder/depacketizer 1076 is simply any decoders that are complementary to the encoder/packetizer 1016 as discussed above for decoding the bitstreams generated by the encoder/packetizer 1016 and for implementing the error concealment method as described above. The decoder 1076 can be a physical device, which is coupled to the CPU 1072 through a communication channel. Alternatively, the decoder/depacketizer 1076 can be represented by a software application which is loaded from a storage device, e.g., a magnetic or optical disk, and resides in the memory 1074 of the computer. As such, any of complementary decoders of the encoder/packetizer 1016 of the present invention can be stored on a computer readable medium.

The computer 1060 can be coupled to a plurality of input and output devices 1080, such as a keyboard, a mouse, a video monitor, or any number of devices for storing or distributing images, including but not limited to, a tape drive, a floppy drive, a hard disk drive or a compact disk drive. The input devices serve to allow the computer for storing and distributing the sequence of decoded video images.

Although various embodiments which incorporate the teachings of the present invention have been shown and described in detail herein, those skilled in the art can readily devise many other varied embodiments that still incorporate these teachings.

What is claimed is:

1. A method for packetizing a bitstream, where said bitstream carries an entropy encoded image, said method comprising the steps of:
   a) generating a packet header;
   b) generating a payload comprising a plurality of payload segments with each payload segment having at least one sub-unit comprising of hierarchical subband decomposed coefficients of said entropy encoded image; and
   c) inserting a coded segment marker after each of said plurality of payload segments.

2. The method of claim 1, wherein said inserting step comprises the step of inserting a coded segment marker after said at least one sub-unit and only after a predefined number of bits have been exceeded.

3. The method of claim 2, wherein said generating step (b) generates a payload segment having at least one sub-unit that is defined in accordance with a tree-depth scanning order of said entropy encoded image.

4. The method of claim 2, wherein said generating step (b) generates a payload segment having at least one sub-unit that is defined in accordance with a layer-by-layer scanning order of said entropy encoded image.

5. The method of claim 2, wherein said generating step (b) generates a payload segment having at least one sub-unit that is defined in accordance with a band-by-band scanning order of said entropy encoded image.

6. A data structure stored on a computer readable medium comprising:
   a packet header;
   a payload, coupled to said packet header, where said payload comprises a plurality of payload segments, with each of said payload segments having at least one sub-unit comprising of hierarchical subband decomposed coefficients of an entropy encoded image; and
   a plurality of segment markers with one of said plurality of segment markers being coupled after one of said payload segments.

7. The data structure of claim 6, wherein said sub-unit is defined in accordance with a tree-depth scanning order of an entropy encoded image.

8. The data structure of claim 6, wherein said sub-unit is defined in accordance with a layer-by-layer scanning order of an entropy encoded image.

9. The data structure of claim 6, wherein said sub-unit is defined in accordance with a band-by-band scanning order of an entropy encoded image.

10. A method for decoding a bitstream, where said bitstream carries an entropy encoded image, said method comprising the steps of:
   a) decoding a packet header;
   b) decoding a payload comprising a plurality of payload segments with each payload segment having at least one sub-unit of said entropy encoded image;
   c) searching for a coded segment marker after each of said plurality of payload segments; and
   d) deleting said at least one sub-unit of said entropy encoded image in one of said plurality of payload segments if said coded segment marker after a corresponding payload segment is undetected.

11. The method of claim 10, wherein said detecting step c) comprises the step of detecting a coded segment marker after said at least one sub-unit and only after a predefined number of bits have been exceeded.

12. The method of claim 11, wherein said decoding step (b) decodes a payload segment having at least one sub-unit that is defined in accordance with a tree-depth scanning order of said entropy encoded image.

13. The method of claim 11, wherein said decoding step (b) decodes a payload segment having at least one sub-unit that is defined in accordance with a layer-by-layer scanning order of said entropy encoded image.

14. The method of claim 11, wherein said decoding step (b) decodes a payload segment having at least one sub-unit that is defined in accordance with a band-by-band scanning order of said entropy encoded image.

15. The method of claim 11, wherein said deleting step (d) comprises the step of zeroing out all coefficients representative of said at least one sub-unit from a last correctly detected coded segment marker.

16. A computer-readable medium having stored thereon a plurality of instructions, the plurality of instructions including instructions which, when executed by a processor, cause the processor to perform the steps comprising of:
   a) generating a packet header;
   b) generating a payload comprising a plurality of payload segments with each payload segment having at least one sub-unit comprising of hierarchical subband decomposed coefficients of said entropy encoded image; and
   c) inserting a coded segment marker after each of said plurality of payload segments.

17. The computer-readable medium of claim 16, wherein said inserting step comprises the step of inserting a coded segment marker after said at least one sub-unit and only after a predefined number of bits have been exceeded.

18. A computer-readable medium having stored thereon a plurality of instructions, the plurality of instructions including instructions which, when executed by a processor, cause the processor to perform a method for decoding a bitstream, where said bitstream carries an entropy encoded image, the steps comprising of:
   a) decoding a packet header;
   b) decoding a payload comprising a plurality of payload segments with each payload segment having at least one sub-unit of said entropy encoded image;
   c) searching for a coded segment marker after each of said plurality of payload segments; and
   d) deleting said at least one sub-unit of said entropy encoded image in one of said plurality of payload segments if said coded segment marker after a corresponding payload segment is undetected.

19. A method for entropy coding, said method comprising the steps of:
   (a) obtaining a plurality of coefficients representative of an image for entropy coding, wherein each of said plurality of coefficients has relative coordinate (i, j); and
   (b) entropy coding a current coefficient in accordance with a context model consisting only three neighboring coefficients at relative coordinates of (i−1, j−1), (i−1, j) and (i, j−1), wherein said entropy coding step (b) codes said coefficients using a context model in accordance with:

$$\text{Model\_no} = f(i-1, j-1) + f(i-1, j)*2 + f(i, j-1)*4$$

where $$f(x, y) = \begin{cases} 1, & \text{if coeff}(x, y) \text{ is available and nonzero} \\ 0, & \text{else} \end{cases}$$

Model_no is the number of a context model selected, coeff(x, y) is a value of a coefficient at coordinate (x, y), and f(i, j) is a function f(x, y) at coordinate (i, j).

* * * * *